(12) United States Patent
Caballero et al.

(10) Patent No.: US 11,141,640 B2
(45) Date of Patent: Oct. 12, 2021

(54) EYE GAZE TRAINING DEVICE AND METHOD

(71) Applicants: Digno Caballero, Miami, FL (US); Jorge C. Almirall, Atlanta, GA (US); Dirk Hoyns, Jackson, GA (US); Sam Elia, Atlanta, GA (US)

(72) Inventors: Digno Caballero, Miami, FL (US); Jorge C. Almirall, Atlanta, GA (US); Dirk Hoyns, Jackson, GA (US); Sam Elia, Atlanta, GA (US)

( * ) Notice: Subject to any disclaimer, the term of this patent is extended or adjusted under 35 U.S.C. 154(b) by 0 days.

(21) Appl. No.: 16/665,859

(22) Filed: Oct. 28, 2019

(65) Prior Publication Data

US 2020/0129828 A1 Apr. 30, 2020

Related U.S. Application Data

(60) Provisional application No. 62/751,675, filed on Oct. 28, 2018.

(51) Int. Cl.
*A63B 69/00* (2006.01)
*G06K 9/00* (2006.01)
(Continued)

(52) U.S. Cl.
CPC .......... *A63B 69/0017* (2013.01); *A63B 49/00* (2013.01); *A63B 60/46* (2015.10);
(Continued)

(58) Field of Classification Search
CPC . A63B 69/0002; A63B 60/46; A63B 69/3632; A63B 2069/0008; A63B 51/02;
(Continued)

(56) References Cited

U.S. PATENT DOCUMENTS 3,948,517 A 4/1976 Feiler
4,392,650 A 7/1983 Hilton
(Continued)

FOREIGN PATENT DOCUMENTS

CN 1057180059 7/2008

*Primary Examiner* — Mitra Aryanpour
(74) *Attorney, Agent, or Firm* — Crose Law LLC; Bradley D. Crose

(57) ABSTRACT

An eye gaze training device is disclosed, including associated methods to record an impact and to provide a cue or feedback with a proper delay between action and instinctual eye tracking, improve hand-eye coordination, and thereby to improve one's performance in a sport, athletic event, or the like. This training device and associated methods provides for detection, recording, classification, translation, transmission, and learning, all associated with teaching and learning the proper way of striking an object with another object with proper hand-eye coordination. In various embodiments associated systems and methods of the eye gaze training device are included. In at least one embodiment, the eye gaze training device includes a microcontroller, impact sensor, power source, feedbacks, alert device, control settings and switches, accelerometers, position detectors, any one or more of which may be used in an eye gaze training device, as well as additional devices such as headbands, waist devices, leg devices.

18 Claims, 4 Drawing Sheets

(51) Int. Cl.
*G06F 3/01* (2006.01)
*A63B 60/46* (2015.01)
*A63B 49/00* (2015.01)

(52) U.S. Cl.
CPC .......... *A63B 69/0002* (2013.01); *G06F 3/013* (2013.01); *G06K 9/00342* (2013.01); *A63B 2069/0008* (2013.01)

(58) Field of Classification Search
CPC ......... A63B 49/00; A63B 49/02; G06F 3/013; G06K 9/00342
USPC ....... 473/422, 451, 457, 458, 450, 463, 461, 473/516, 521, 564, 453
See application file for complete search history.

(56) References Cited

U.S. PATENT DOCUMENTS

| | | | |
|---|---|---|---|
| 4,732,382 A | 3/1988 | Ratner | |
| 4,822,042 A | 4/1989 | Landsman | |
| 5,031,909 A | 7/1991 | Pecker | |
| 5,203,558 A | 4/1993 | An | |
| 5,380,001 A | 1/1995 | Socci et al. | |
| 5,447,305 A | 9/1995 | Socci et al. | |
| 5,553,857 A | 9/1996 | Fish | |
| 5,649,699 A | 7/1997 | Todoroff | |
| 5,685,782 A | 11/1997 | Lipps et al. | |
| 5,692,965 A | 12/1997 | Nighan, Jr. et al. | |
| 5,709,610 A * | 1/1998 | Ognjanovic | A63B 69/3617 473/223 |
| 5,800,278 A | 9/1998 | Varriano | |
| 5,893,805 A | 4/1999 | Douglass | |
| 6,048,324 A | 4/2000 | Socci et al. | |
| 6,331,168 B1 | 12/2001 | Socci et al. | |
| 7,169,067 B2 | 1/2007 | Town | |
| 7,513,833 B1 | 4/2009 | Town | |
| 7,749,110 B2 | 7/2010 | Bozof | |
| 8,553,936 B2 | 10/2013 | Fogt | |
| 8,574,101 B2 | 11/2013 | Wheelbarger et al. | |
| 8,911,309 B1 * | 12/2014 | Harihar | A63B 71/0622 473/453 |
| 9,327,177 B2 * | 5/2016 | Yamamoto | A63B 69/38 473/463 |
| 9,442,633 B2 | 9/2016 | Dyer et al. | |
| 9,557,812 B2 | 1/2017 | Maltz | |
| 2006/0068365 A1 | 3/2006 | Smith | |
| 2007/0105666 A1 | 5/2007 | Fernandez et al. | |
| 2009/0221388 A1 * | 9/2009 | Giannetti | A63B 60/46 473/457 |
| 2011/0007275 A1 | 1/2011 | Yoo et al. | |
| 2011/0021280 A1 | 1/2011 | Boroda et al. | |
| 2013/0196794 A1 | 8/2013 | Wheelbarger et al. | |
| 2013/0217520 A1 * | 8/2013 | Gaede | A63B 69/38 473/459 |
| 2014/0180451 A1 | 6/2014 | Marty | |
| 2016/0144260 A1 | 5/2016 | Cohen et al. | |
| 2016/0199702 A1 * | 7/2016 | Bothwell | A63B 49/11 473/524 |
| 2016/0225153 A1 | 8/2016 | Kim | |
| 2018/0161657 A1 * | 6/2018 | Direnzo | A63B 69/208 482/83 |

* cited by examiner

EYE GAZE TRAINING DEVICE AND METHOD

CROSS-REFERENCE TO RELATED APPLICATION(S)

The present non-provisional patent application claims the benefit of priority of U.S. Provisional Patent Application No. 62/751,675, which is entitled "EYE GAZE TRAINING DEVICE AND METHOD", which was filed on Oct. 28, 2018, and which is incorporated in full by reference herein.

FIELD OF THE INVENTION

The technology described herein relates generally to the fields of electronics, sports, athletic events, and training aids to aid and train an athlete for such sports and events. More specifically, this technology relates to an eye gaze training device and associated methods to record an impact and to provide a cue or feedback with a proper delay between action and instinctual eye tracking, improve hand-eye coordination, and thereby to improve one's performance in a sport, athletic event, or the like. Furthermore, this technology relates to a training device and associated methods for detection, recording, classification, translation, transmission, and learning, all associated with teaching and learning the proper way of striking an object with another object with proper hand-eye coordination.

BACKGROUND OF THE INVENTION

Hand-eye coordination is critically important in many sports and athletic activities. By way of example, tennis, golf, ping pong, squash, baseball, and so forth, are sports and activities in which proper hand coordination makes for the best use of or hitting of an object, ball, racket, etc. Improper hand-eye coordination, such as moving the head or eyes before and after contact, can make for an errant shot, contact, hit, etc. as the case may be depending on the sport or activity.

Many sports and athletic activities require proper follow-through where head movement caused by eye-tracking responses must be unlearned to ensure that the eye focus and the swing, contact, impact, or the like is smooth and stable. A device and method are needed to detect and/or record an impact and provide a cue or feedback to train a proper delay between action and instinctual eye tracking or tendency to check for the direction or result of the stroke before the follow through post impact is completed.

Related utility patents known in the background art include the following listed patents:

U.S. Pat. No. 4,392,650, issued to Hilton on Jul. 12, 1983, discloses a tennis training aid.

U.S. Pat. No. 4,822,042, issued to Landsman on Apr. 18, 1989, discloses electronic athletic equipment.

U.S. Pat. No. 5,031,909, issued to Pecker on Jul. 16, 1991, discloses an electronic athletic equipment.

U.S. Pat. No. 5,380,001, issued to Socci et al. on Jan. 10, 1995, discloses a baseball batting aid.

U.S. Pat. No. 5,447,305, issued to Socci et al. on Sep. 5, 1995, discloses a baseball batting aid for detecting motion of head in more than one axis of motion.

U.S. Pat. No. 5,553,857, issued to Fish on Sep. 10, 1996, discloses a physical activity training device and method.

U.S. Pat. No. 5,685,782, issued to Lipps et al. on Nov. 11, 1997, discloses a golf practice apparatus.

U.S. Pat. No. 5,692,965, issued to Nighan, Jr. et al. on Dec. 2, 1997, discloses a golf swing training device with laser.

U.S. Pat. No. 5,800,278, issued to Varriano on Sep. 1, 1998, discloses an apparatus for signaling proper alignment of user's eye and object to be struck.

U.S. Pat. No. 5,893,805, issued to Douglass on Apr. 13, 1999, discloses a golf swing training apparatus.

U.S. Pat. No. 7,169,067, issued to Town on Jan. 30, 2007, discloses a hand to eye coordination training aid.

U.S. Pat. No. 7,513,833, issued to Town on Apr. 7, 2009, discloses a golf swing eye to hand coordination training aid.

U.S. Pat. No. 9,442,633, issued to Dyer et al. on Sep. 13, 2016, discloses a sports swing mechanics training device.

U.S. Pat. No. 9,557,812, issued to Maltz on Jan. 31, 2017, discloses an eye gaze user interface and calibration method.

U.S. Pat. No. 3,948,517, issued to Feiler on Apr. 6, 1976, discloses a tennis stroke practice device.

U.S. Pat. No. 4,732,382, issued to Ratner on Mar. 22, 1988, discloses a tennis training device.

U.S. Pat. No. 5,203,558, issued to An on Apr. 20, 1993, discloses an unidirectional flexible spinner.

U.S. Pat. No. 5,649,699, issued to Todoroff on Jul. 22, 1997, discloses a racquet sports training device.

U.S. Pat. No. 6,048,324, issued to Socci et al. on Apr. 11, 2000, discloses head gear for detecting head motion and providing an indication of head movement.

U.S. Pat. No. 6,331,168, issued to Socci et al. on Dec. 18, 2001, discloses golf training head gear for detecting head motion and providing an indication of head movement.

U.S. Pat. No. 7,749,110, issued to Bozof on Jul. 6, 2010, discloses a racquet sport training system.

U.S. Pat. No. 8,553,936, issued to Fogt on Oct. 8, 2013, discloses a gaze tracking measurement and training system and method.

U.S. Pat. No. 8,574,101, issued to Wheelbarger et al. on Nov. 5, 2013, discloses a training device to enhance hand-eye coordination.

Related published utility patent applications known in the art include the following listed published patent applications:

U.S. Patent Application Publication No. 2006/0068365, filed by Smith and published on Mar. 30, 2006, discloses a vision training system.

U.S. Patent Application Publication No. 2013/0196794, filed by Wheelbarger et al. and published on Aug. 1, 2013, discloses a training device to enhance hand-eye coordination.

U.S. Patent Application Publication No. 2014/0180451, filed by Marty and published on Jun. 26, 2014, discloses a trajectory detection and feedback system for tennis.

U.S. Patent Application Publication No. 2011/0007275, filed by Yoo et al. and published on Jan. 13, 2011, discloses an eye and body movement tracking for testing and/or training.

U.S. Patent Application Publication No. 2016/0225153, filed by KIM and published on Aug. 4, 2016, discloses an apparatus and method for tracking eye-gaze.

U.S. Patent Application Publication No. 2016/0144260, filed by Cohen et al. and published on May 26, 2016, discloses a tennis racket sensor system and coaching device.

U.S. Patent Application Publication No. 2011/0021280, filed by Boroda et al. and published on Jan. 27, 2011, discloses a hitting technique by identifying ball impact points.

U.S. Patent Application Publication No. 2007/0105666, filed by Fernandez et al. and published on May 10, 2007, discloses a computer for rackets or paddles.

Related foreign patents known in the art include the following listed patents:

CN Patent No. 1057180059, issued to Fullmer, et al. on Jul. 15, 2008, discloses a time-out seat with changeable audio signal.

The foregoing patent and other information reflect the state of the art of which the inventor is aware and are tendered with a view toward discharging the inventor's acknowledged duty of candor in disclosing information that may be pertinent to the patentability of the technology described herein. It is respectfully stipulated, however, that the foregoing patent and other information do not teach or render obvious, singly or when considered in combination, the inventor's claimed invention.

BRIEF SUMMARY OF THE INVENTION

In various exemplary embodiments, the technology described herein provides an eye gaze training device and associated methods to record an impact and to provide a cue or feedback with a proper delay between action and instinctual eye tracking, improve hand-eye coordination, and thereby to improve one's performance in a sport, athletic event, or the like. This training device and associated methods provides for detection, recording, classification, translation, transmission, and learning, all associated with teaching and learning the proper way of striking an object with another object with proper hand-eye coordination. This training device is implemented in a wearable version that may be placed on the body of the wearer, such as a wrist wearable device, headband, leg band, and so forth. This training device is implemented in a version directly on or within the instrument used, such as a golf club, tennis racket, and so forth.

In at least one exemplary embodiment, the technology described herein provides a training device to detect the impact of an object. In various embodiments, such detection is done through movement, vibration, noise, and/or other means.

In at least one exemplary embodiment, the technology described herein provides a training device to detect and record all impacts an object used in sports activities has experienced and provides alerts to indicate less than optimal performance or recommend replacement or recommend useful life remaining at less than optimal condition.

In at least one exemplary embodiment, the technology described herein provides a training device that transmits and provides notification for training a response.

In one embodiment of the training device, the device further includes a detector operatively associated with each sensor and signal type providing an electrical response in the presence of said signal.

In one embodiment of the training device, the device may be affixed to the trainee's body or the equipment or tool being impacted that can output some feedback signal.

In one embodiment of the training device, the signal or feedback output can be triggered and transmitted with a programmable delay.

In one embodiment of the training device, the feedback signal can be recorded and correlated with the detection of the impact and with different feedback transmissions and signals.

In one embodiment of the training device, the device can record, store, transmit and display the results of the detection, feedback and correlation with success the subject keeping his/her head stable during the time of impact detection and after the time delay being trained to the student.

In one embodiment of the training device, the signal for teaching the proper learning delays is transmitted through vibration.

In one embodiment of the training device, the signals for teaching the proper learning delay are transmitted through sound.

In one embodiment of the training device, the signal for teaching the proper learning delay is transmitted through light flashes of varying intensity color and patterns.

In one embodiment of the training device, the signal for teaching the proper learning delay is transmitted through the cessation of an existing signal in various forms: sounds, light, vibration, temperature change, electrical shock, electrical signal to the brain through and electrode, light flashes, light patterns with varying intermittent delays.

In at least one exemplary embodiment, the technology described herein provides a device that detects impacts and counts and records number of these against an optimal performance versus impact curve and reports percent of optimal performance, useful optimal life, and value of remaining less than optimal life for the device being used.

In at least one exemplary embodiment, the technology described herein provides a device that collects performance metrics and can provide historical data in some form via a smartphone app.

In at least one exemplary embodiment, the technology described herein provides a training device disposed on or within a sporting goods article such as a tennis racket, wherein the device is a vibration dampener that is hollow within and contains a device to sense impact and trigger a signal, after a programmable time delay, that is correlated with good hitting practice, the device alerts the player when she could have already looked up from the hitting zone to follow or track the tennis ball struck in the stroke with a series of potential feedbacks: sound, lights, vibration, electric stimulation, pressure, temperature change (general or broad list of human-possible sensations).

In one varied embodiment, the training device includes a second device mounted to the head via a head-band that could be wrapped around the head or a hat, for example that would accept a trigger notification from the first device and provide feedback to the player indicating if he has held his head in the proper position a sufficient amount of time.

In one varied embodiment, the training device includes additional devices to attach to the waist or legs or elsewhere that provide additional feedback to the player.

In one varied embodiment, the training device also can detect the full arch of a stroke from impact through follow-through, and count time and/or distance and signal when the player has executed a full stroke. The arch or path of the racket through a complete stroke is determined by use of various associated measures: height of the racket from the ground, degrees of rotation of the monitoring object by detecting its orientation: where it is facing at the beginning and end of the stroke. If the face of the device faces towards the direction of the path of the ball at the beginning and now it faces away from the path of the ball after a period, then these measures correlate to the degree of completeness of the stroke through beginning and follow-through.

In one varied embodiment, the training device also incorporates the impact detection on a wrist wearable device, or other wearable device, that the player wears. The vibration detection triggers a timing mechanism that then triggers a feedback that correlates and teaches the proper delay for a player to have tracked the ball after impact. The wrist band also would associate the orientation of the inside of the hand as it follows through a full forehand stroke through a timing period correlated with a full stroke. The same wrist band on the side facing the direction of the ball and in the back side of the hand would also change orientation through a timing period correlated with a full backhand stroke.

In one varied embodiment, the training device also incorporates a leg-band in order to detect impact with the foot. The impact detection device could also be integrated into a shoe for convenience.

In one varied embodiment, the training device utilizes incorporation with a smartphone for logging of information for a player and/or a coach.

In operation, and by way of example, the training device can be utilized by one or more of the following methods steps:

utilizing a training device to detect the impact of an object;

utilizing one or more of movement, vibration, noise, and/or other means to detect the impact of the object;

providing an alert to indicate less than optimal performance;

providing an alert to indicate useful life remaining at less than optimal condition for resale value;

transmitting and providing notification for training a response;

utilizing a detector operatively associated with each sensor and signal type providing an electrical response in the presence of said signal;

affixing the training device to the trainee's body or the equipment or tool being impacted that can output some feedback signal;

triggering and transmitting with a programmable delay the signal or feedback output;

recording and correlating the feedback signal with the detection of the impact and with different feedback transmissions and signals;

recording, storing, transmitting and displaying by the device the results of the detection, feedback and correlation with success the subject keeping his/her head stable during the time of impact detection and after the time delay being trained to the student;

transmitting through vibration the signals for teaching the proper learning delays;

transmitting through sound the signals for teaching the proper learning delay;

transmitting through light flashes of varying intensity color and patterns the signals for teaching the proper learning delay;

transmitting through the cessation of an existing signal in various forms: sounds, light, vibration, temperature change, electrical shock, electrical signal to the brain through and electrode, light flashes, light patterns with varying intermittent delays the signals for teaching the proper learning delay detecting impacts and counting and recording the number of these against an optimal performance versus impact curve and reporting percent of optimal performance, useful optimal life, and value of remaining less than optimal life for the device being used; and collecting performance metrics and providing historical data in some form via a smartphone app.

Additional method steps can include:

utilizing a training device disposed on or within a sporting goods article such as a tennis racket, wherein the device is a vibration dampener that is hollow within a contains a device to sense impact and trigger a signal, after a programmable time delay, that is correlated with good hitting practice, the device alerting the player when she could have already looked up from the hitting zone to follow or track the tennis ball struck in the stroke with a series of potential feedbacks: sound, lights, vibration, electric stimulation, pressure, temperature change (general or broad list of human-possible sensations);

utilizing a second device mounted to the head via a head-band that could be wrapped around the head or a hat, for example that would accept a trigger notification from the first device and provide feedback to the player indicating if he has held his head in the proper position a sufficient amount of time;

utilizing additional devices to attach to the waist or legs or elsewhere that provide additional feedback to the player;

detecting the path of a stroke, or other motion being monitored, and orientation of the device as it moves through the path, from impact through follow-through, and count time and/or distance and signal when the player has executed a full stroke. (The arch or path of the racket, or other device or equipment as applicable, through a complete stroke is determined by use of various associated measures: height of the racket from the ground, degrees of rotation, acceleration, compass, gyroscope of the monitoring object by detecting its orientation and where it is facing at the beginning and end of the stroke. If the face of the device faces towards the direction of the path of the ball at the beginning and now it faces away from the path of the ball after a period, then these measures correlate to the degree of completeness of the stroke through beginning and follow-through);

incorporating the impact detection on a wrist wearable device, or other wearable device, that the player wears. (The vibration detection triggers a timing mechanism that then triggers a feedback that correlates and teaches the proper delay for a player to have tracked the ball after impact. The wrist band also would associate the orientation of the inside of the hand as it follows through a full forehand stroke through a timing period correlated with a full stroke. The same wrist band on the side facing the direction of the ball and in the back side of the hand would also change orientation through a timing period correlated with a full backhand stroke);

incorporating a leg-band in order to detect impact with the foot. (The impact detection device could also be attached to or integrated into a shoe for convenience); and utilizing incorporation with a smartphone for logging of information for a player and/or a coach.

It will be apparent to those skilled in the art, after reading this disclosure, which methods steps disclosed can be performed simultaneously or in a different order than that depicted or omitted given the nature of a particular procedure.

Advantageously, the technology described herein will translate coaching admonitions into measurable and felt cues that correlate with increasing best practice. For example, a student will be able to associate a physical cue and a measurable delay to the time or lag he is applying during his swing to the instinct of following the path of the ball after impact. Additionally, the device will allow for the recording of the total number of impacts the frame of the racket, the bat, paddle, shoe sole, or other such equipment has experienced during its deployment.

There has thus been outlined, rather broadly, the more important features of the technology in order that the detailed description thereof that follows may be better understood, and in order that the present contribution to the art may be better appreciated. There are additional features of the technology that will be described hereinafter, and which will form the subject matter of the claims appended hereto. In this respect, before explaining at least one embodiment of the technology in detail, it is to be understood that the invention is not limited in its application to the details of construction and to the arrangements of the components set forth in the following description or illustrated in the drawings. The technology described herein is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the technology described herein.

Further objects and advantages of the technology described herein will be apparent from the following detailed description of a presently preferred embodiment which is illustrated schematically in the accompanying drawings.

BRIEF DESCRIPTION OF THE DRAWINGS

The technology described herein is illustrated with reference to the various drawings, in which like reference numbers denote like device components and/or method steps, respectively, and in which.

DETAILED DESCRIPTION OF THE INVENTION

Figures 1A, 1B:
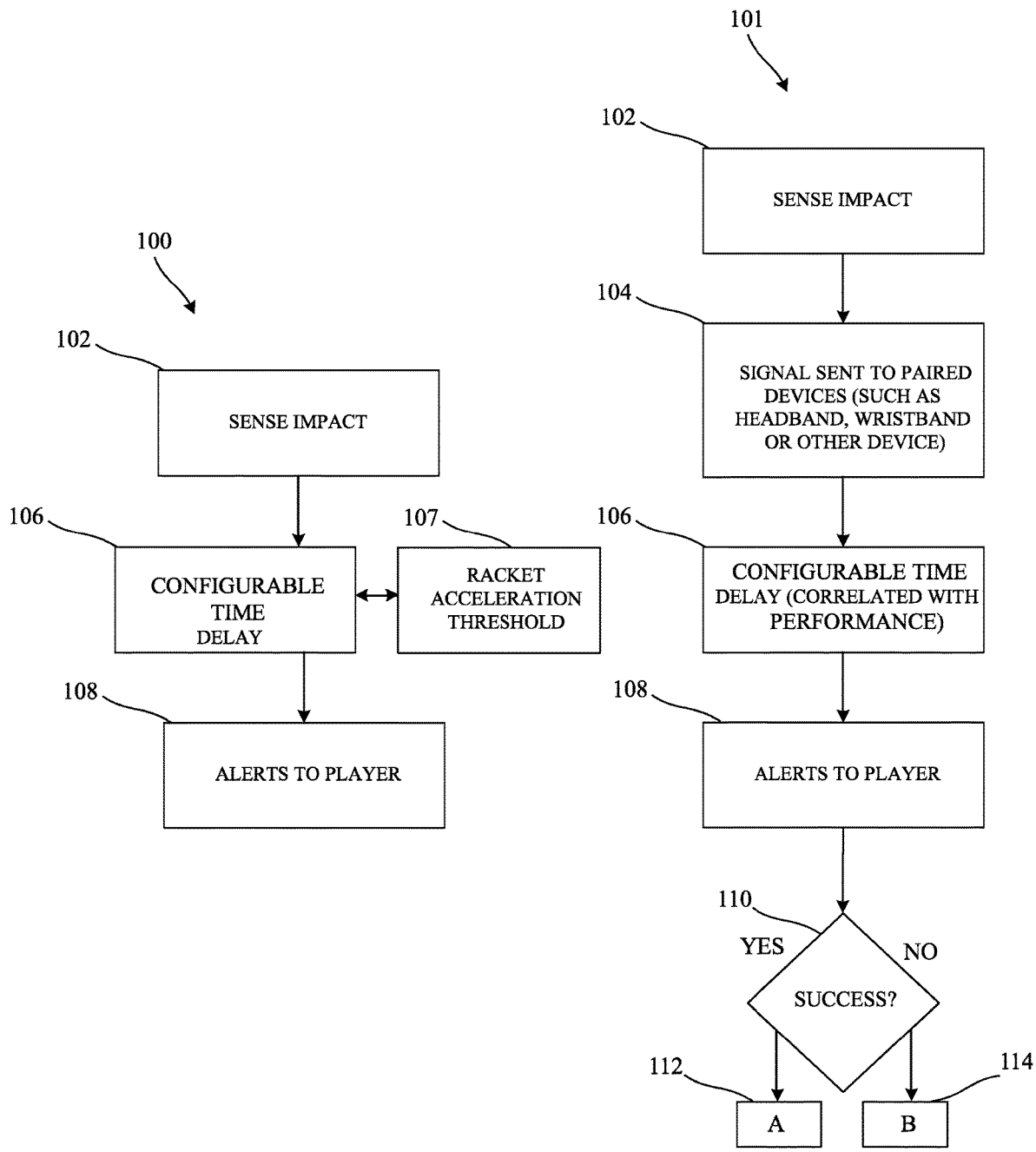
FIG. 1A is a flowchart diagram illustrating exemplary method steps by which an eye gaze training device is used to aid a user in improved hand-eye coordination and improvements sports and athletic performance, according to an embodiment of the technology described herein.
FIG. 1B is a flowchart diagram illustrating another exemplary method steps by which an eye gaze training device is used to aid a user in improved hand-eye coordination and improvements sports and athletic performance, according to an embodiment of the technology described herein.
Figure 2:
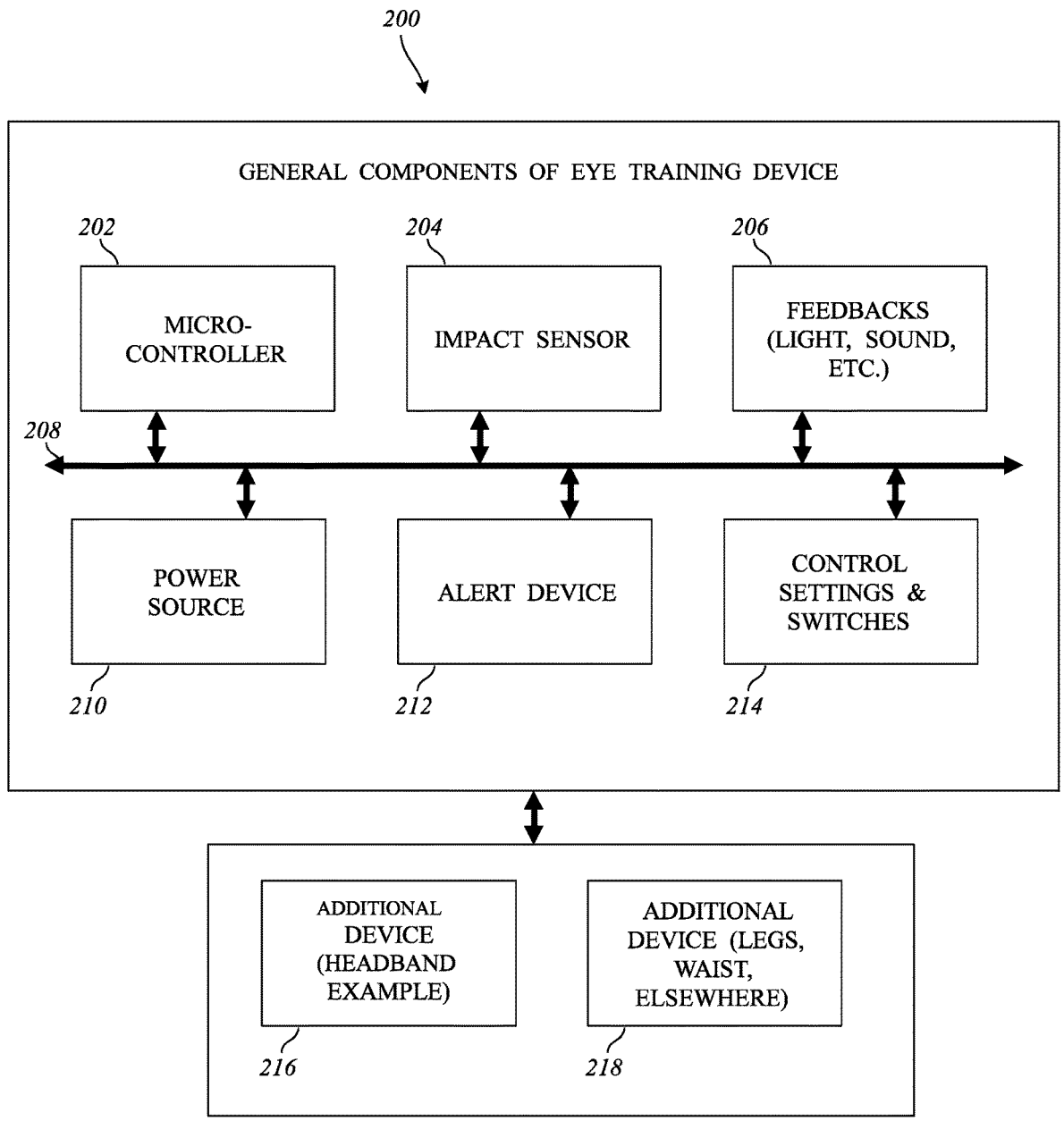
FIG. 2 is a schematic diagram illustrating the general components of an eye gaze training device, illustrating, in particular, a microcontroller, impact sensor, power source, feedbacks, alert device, control settings and switches, any one or more of which may be used in an eye gaze training device, as well as additional devices such as headbands, waist devices, leg devices, and so forth, according to an embodiment of the technology described herein.

Before describing the disclosed embodiments of this technology in detail, it is to be understood that the technology is not limited in its application to the details of the particular arrangement shown here since the technology described is capable of other embodiments. Also, the terminology used herein is for the purpose of description and not of limitation.

The technology described herein allows for several activities: detection, recording, classification, translation, transmission, and learning; associated with teaching and learning the proper way of striking an object with another object. In its essence this device allows for proper association of various signals involved in correct hand-eye coordination and is a better training device for the improvement of movement and results in many activities requiring these skills.

The training device records an impact and provides a cue or feedback with a proper delay between action and instinctual eye tracking. Many sports and activities require proper follow-through where head movement and eye-tracking responses must be unlearned to ensure that the focus and the swing is smooth and stable.

The training device detects various types of signals: movement, vibration, sound, light, temperature change, electrical impulse, scents, etc., tied to the impact of hitting an object with an equipment, and translates and transmits impact detection into notifications with varying time delays. For example, the device applied to a sport such as tennis, may detect impact vibration, impact noise, or impact motion and imaging signals from the ball being hit by the racket and then translate these detected signals into feedback responses or cues with built-in chosen delay periods for increasing expertise and learning in order to keep the eyes on the ball or the hitting zone.

This training device is implemented in a wearable version that may be placed on the body of the wearer, such as a wrist wearable device, headband, leg band, and so forth. This training device is implemented in a version directly on or within the instrument used, such as on or within a golf club, tennis racket, or the like. In at least one embodiment, the device, or a portion of the device, is embedded within the instrument. By way of example, a device embedded in a tennis racket, or other equipment, may include an odometer embedded within, for example, to capture total number of uses of the racket at a given threshold or impact level.

Using the input detection, the training device can provide output notifications, such as feedback signals, of varying delay in various areas of the user's body. By experiencing the various time delays between detection of impact of the hand-held or attached device to the subject's body, the user can learn how to maintain eye gaze in the impact area and learn, in a kinesthetic way, proper head and body stability through an impact zone.

In one exemplary embodiment, with respect to tennis, the speed of detection is determined and response parameters that the training device can use to generate various learning feedback cues at varying delays that match a given, desired level of expertise.

In training for proper form in executing a movement requiring a device that will impact an object, either stationary or in motion, coaches and teachers provide aural or visual cues for the student to learn proper hand-eye coordination. The learning process requires the teacher and the student to understand the proper delay and response between impacts and follow-through with the eyes and the head tracking the propelled object impacted.

Tennis, golf, Jai-a-lai, baseball, cricket, badminton, racquetball, pool, billiards, etc., are sports that use hand-held devices for striking moving or static objects requiring proper head stability and eye gaze focus or delay. The teaching of the eye gaze stability requires feedback that trains the increasing delay after impact of the eyes and trains away the propensity of the eyes to look up and follow or track the object after it is impacted by the hand-held or otherwise attached device to the body. As will be apparent to one upon reading of this disclosure, the claims devices and methods are applicable to not only the sports and activities listed but also to all activities wherein a motion with a motor skill can be monitored and improved with implementation of the devices and methods disclosed herein.

In the case of sports where the objects are struck with foot or a hand or a head, the eye and body stability are also trained and this device would be applicable for training and teaching success in these sports too.

Proper hand-eye coordination and head stability after striking a tennis ball or a golf ball, for example, involves breaking the reflex of the eyes wanting to follow the track of the ball. This device can provide a signal that can teach the reflex of delay and head stability to someone that is learning proper form in their sport or activity.

Coaches in sports requiring hand-eye coordination and where the player must strike an object with a bat, a paddle, a racquet, a club, or any such type of equipment instruct their charges on "keeping the eye" on the object being struck. This invention creates a feedback mechanism that helps a coach and his student(s) to better learn the timing and the mechanics of the swing that results in good striking of the object with better focus.

The thought behind the admonition of "keeping the eye" or focus on the object being struck during the swing, is to ensure a stable body position for the player during the swing. The stable position must ensure that the head stays fixed during the swing so that the swing is balanced and consistent through the hitting zone of the swing.

The technology described herein provides a cue for the player to learn the timing of the stability through the hitting zone that is required for levels of proficiency or skill in their sport or activity.

The technology described herein will allow for the simple admonition of "keep your eyes" on the ball to be translated into physical and kinesthetically felt sensations that the player can associate with the moment of impact with his sports equipment, the ball or object being struck, and the position of his eyes and the stability of his head through the swing. By creating increasing time delays between the moment of impact and when it is OK to follow through with looking up to where the object was propelled to, the player can learn the behavior of delaying visual gratification. Conversely, what is being unlearned is the instinct to look up to see where the object went after being struck.

The training device detects and records the moment and the quality of the impact between the object and the sports equipment being used, including the detection of acceleration through the hitting zone or follow through post impact.

As bats, tennis racquets, paddles, etc., have a useful life in that they age or deteriorate with use, it is another problem solved by this device that it can record and count how many "hits" or impacts have occurred and consequently, determine how much optimal and useful life the device (or its associated consumables, such as a tennis racket's strings, a golf club, a baseball bat, or any other device that is used and typically resold) has left. This invention could allow for a resale value determination for second-hand sports (and other types) equipment where the usage rate is hard to assess by seller and buyer if said device is integrated into the equipment.

A proper stroke requires a smooth racket (instrument) movement with acceleration through the hitting zone. The device will be able to train for an optimum acceleration post impact. If the racket decelerates too quickly post impact, then the stroke is not smooth through the impact zone and is choppy and associated with improper follow through and stroke and thus ball control. The device would record how often impact is recorded at the point of maximum racket speed and how often impact is associated with top acceleration pre and post impact.

Referring now to the drawing figures, and in various exemplary embodiments, the technology described herein provides an eye gaze training device 200 and associated methods to record an impact and to provide a cue or feedback with a proper delay between action and instinctual eye tracking, improve hand-eye coordination, and thereby to improve one's performance in a sport, athletic event, or the like. This training device and associated methods provides for detection, recording, classification, translation, transmission, and learning, all associated with teaching and learning the proper way of striking an object with another object with proper hand-eye coordination.

In at least one exemplary embodiment, the technology described herein provides a training device 200 to detect the impact of an object. In various embodiments, such detection is done through movement, vibration, noise, and/or other means.

In at least one exemplary embodiment, the technology described herein provides a training device 200 to detect and record all impacts an object used in sports activities has experienced and provides alerts to indicate less than optimal performance or recommend replacement and useful life remaining at less than optimal condition for resale value.

In at least one exemplary embodiment, the technology described herein provides a training device 200 that transmits and provides notification for training a response.

In one embodiment of the training device, the device 200 further includes a detector operatively associated with each sensor 204 and signal type providing an electrical response in the presence of said signal.

Figure 3:
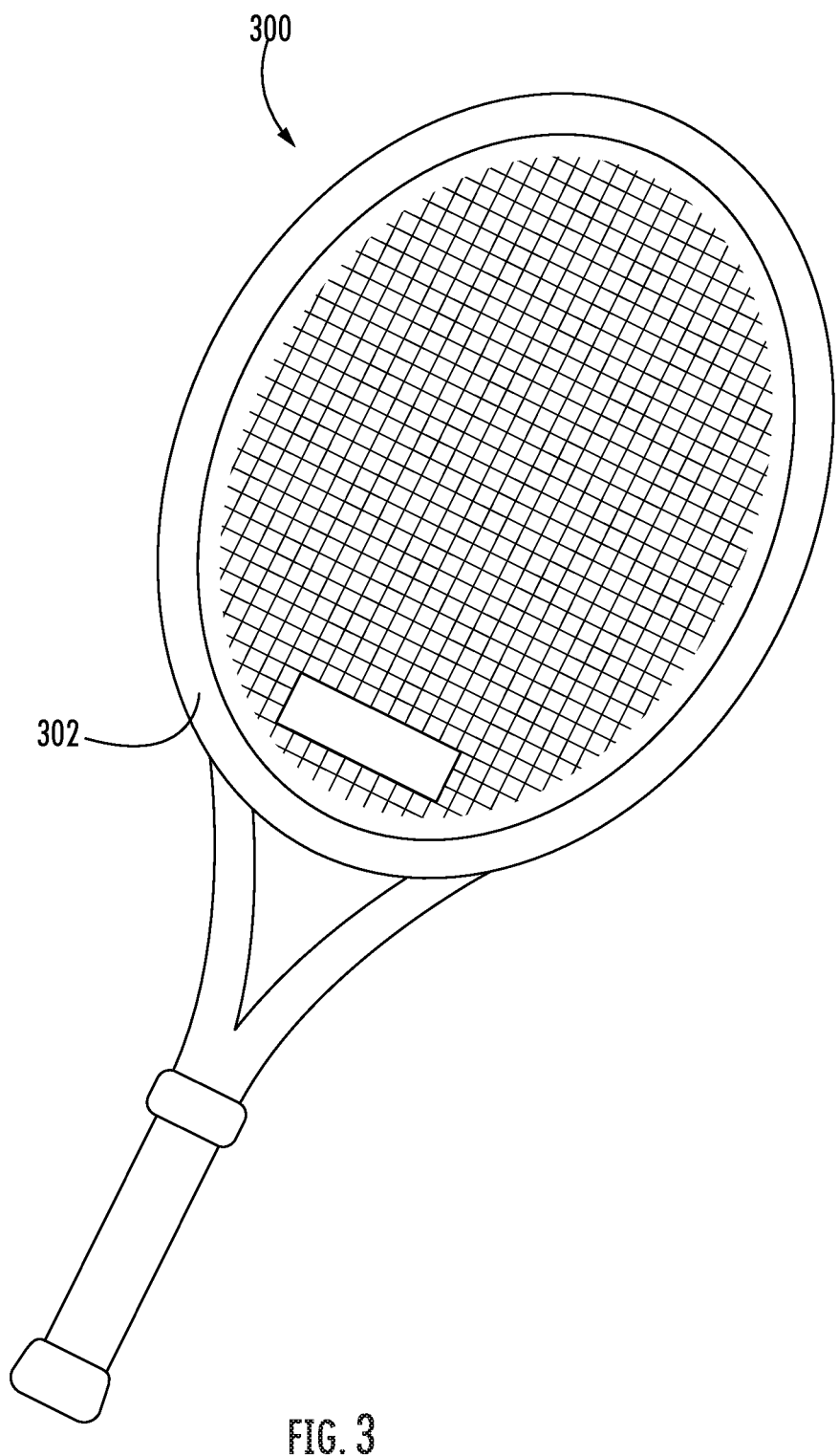
FIG. 3 is a schematic diagram illustrating an eye gaze training device within a tennis racket, and incorporating one or more components of the an eye gaze training device depicted in FIG. 2 in use in a tennis racket, and adapted for the method steps depicted in FIG. 1, according to an embodiment of the technology described herein.
Figure 4:
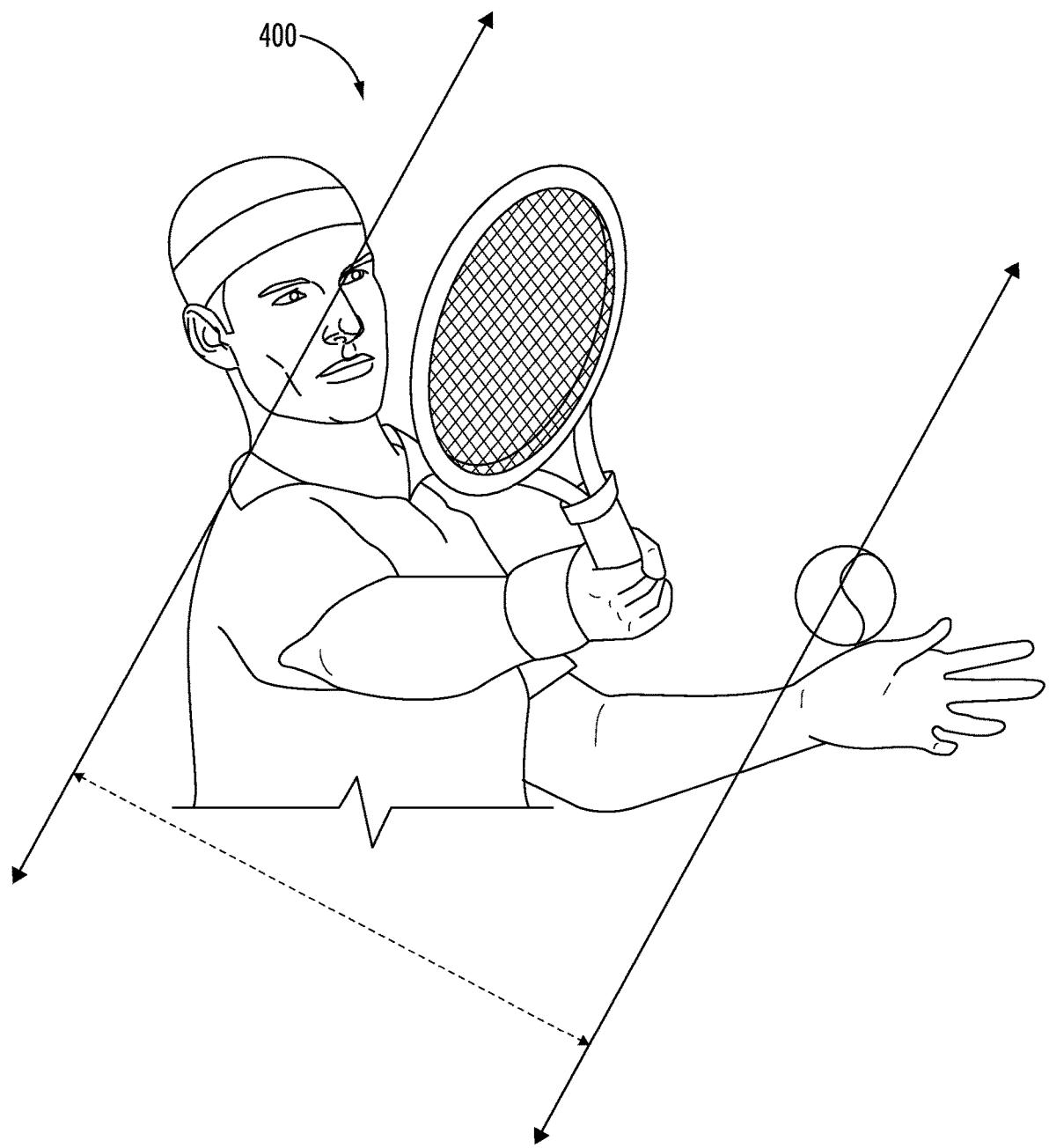
FIG. 4 is a diagram illustrating how eye gaze is maintained in an impact area, once a user has learned, in a kinesthetic way, the proper head and body stability through an impact zone.

In one embodiment of the training device, the device 200 may be affixed to the trainee's body or the equipment (such as a racket in FIG. 3) or tool being impacted that can output some feedback signal.

In one embodiment of the training device, the signal or feedback output 206 can be triggered and transmitted with a programmable delay.

In one embodiment of the training device, the feedback signal 206 can be recorded and correlated with the detection of the impact and with different feedback transmissions and signals.

In one embodiment of the training device, the device 200 can record, store, transmit and display the results of the detection, feedback 206 and correlation with success the subject keeping his/her head stable during the time of impact detection and after the time delay being trained to the student.

In one embodiment of the training device, the signal 206 for teaching the proper learning delays is transmitted through vibration.

In one embodiment of the training device, the signals 206 for teaching the proper learning delay are transmitted through sound.

In one embodiment of the training device, the signal 206 for teaching the proper learning delay is transmitted through light flashes of varying intensity color and patterns.

In one embodiment of the training device, the signal 206 for teaching the proper learning delay is transmitted through the cessation of an existing signal in various forms: sounds, light, vibration, temperature change, electrical shock, electrical signal to the brain through and electrode, light flashes, light patterns with varying intermittent delays.

In at least one exemplary embodiment, the technology described herein provides a device 200 that detects impacts and counts and records number of these against an optimal performance versus impact curve and reports percent of optimal performance, useful optimal life, and value of remaining less than optimal life for the device being used.

In at least one exemplary embodiment, the technology described herein provides a device 200 that collects performance metrics and can provide historical data in some form via a smartphone app.

In at least one exemplary embodiment, the technology described herein provides a training device 200 disposed on or within a sporting goods article such as a tennis racket (FIG. 3), wherein the device is a vibration dampener 302 that is hollow within a contains a device to sense impact and trigger a signal, after a programmable time delay, that is correlated with good hitting practice, the device alerts the player when it is OK to look away from the hitting and/or impact zone, as applicable, to follow or track the tennis ball, or other sporting or like device, struck in the stroke with a series of potential feedbacks: sound, lights, vibration, electric stimulation, pressure, temperature change (general or broad list of human-possible sensations).

In one varied embodiment, the training device 200 includes a second device mounted to the head via a headband that could be wrapped around the head or a hat, for example that would accept a trigger notification from the first device and provide feedback to the player indicating if he has held his head in the proper position a sufficient amount of time.

In one varied embodiment, the training device includes additional devices to attach to the waist or legs or elsewhere that provide additional feedback to the player.

In one varied embodiment, the training device also can detect the full path arch of a stroke, or other motion being monitored, and orientation of the device as it moves through the path, from impact through follow-through, and count time and/or distance and signal when the player has executed a full stroke. The arch or path of the racket, or other device or equipment as applicable, through a complete stroke is determined by use of various associated measures: height of the racket from the ground, degrees of rotation, acceleration, compass, gyroscope of the monitoring object 500 by detecting its orientation: where it is facing at the beginning and end of the stroke. If the face of the device faces towards the direction of the path of the ball at the beginning and now it faces away from the path of the ball after a period, then these measures correlate to the degree of completeness of the stroke through beginning and follow-through.

In one varied embodiment, the training device also incorporates the impact detection on a wrist wearable device, or other wearable device, that the player wears. The vibration detection triggers a timing mechanism that then triggers a feedback that correlates and teaches the proper delay for a player to have tracked the ball after impact. The wrist band also would associate the orientation of the inside of the hand as it follows through a full forehand stroke through a timing period correlated with a full stroke. The same wrist band on the side facing the direction of the ball and in the back side of the hand would also change orientation through a timing period correlated with a full backhand stroke.

In one varied embodiment, the training device also incorporates a leg-band, or device used with or incorporated into a shoe, in order to detect impact with the foot. By way of example, and not of limitation, in one embodiment, a leg-band is used for soccer training. The impact detection device could also be integrated into a shoe for convenience.

In one varied embodiment, the training device utilizes incorporation with a smartphone for logging of information for a player and/or a coach.

In operation, and by way of example, the training device can be utilized by one or more of the following methods steps, and as depicted in part in FIG. 1A, element 100 and in FIG. 1B, element 101:

utilizing a training device to detect the impact of an object 102;

utilizing one or more of movement, vibration, noise, and/or other means to detect the impact of the object;

providing a signal to a paired device such as a headband or other device 104 to count configurable time delay;

providing an alert 108 to indicate useful life remaining at less than optimal condition;

transmitting and providing notification for training a response 108;

utilizing a detector operatively associated with each sensor and signal type providing an electrical response in the presence of said signal;

affixing the training device to the trainee's body or the equipment or tool being impacted that can output some feedback signal;

triggering and transmitting with a configurable and/or programmable delay 106 the signal or feedback output in an embodiment in which feedback is sent;

triggering and transmitting an alert based on tracked racket acceleration 107 and to provide feedback as to whether the user has accelerated their stroke/swing after the point of impact;

recording and correlating the success with the detection of the impact and with different feedback transmissions and signals 110;

if a "YES" response on success, proceeding to A in 112, or if a "NO" response on success, proceeding to B in 114, wherein A actions may include an alert noting the success, a change in the configurable time delay, a return to 102 to start the process again and so forth, and B actions include an alert noting the failure, a change in the configurable time delay and a return to 102 starting the process again, and so forth;

recording, storing, transmitting and displaying by the device the results of the detection, feedback and correlation with success the subject keeping his/her head stable during the time of impact detection and after the time delay being trained to the student 110;

transmitting through vibration the signals for teaching the proper learning delays;

transmitting through sound the signals for teaching the proper learning delay;

transmitting through light flashes of varying intensity color and patterns the signals for teaching the proper learning delay;

transmitting through the cessation of an existing signal in various forms: sounds, light, vibration, temperature change, electrical shock, electrical signal to the brain through and electrode, light flashes, light patterns with varying intermittent delays the signals for teaching the proper learning delay detecting impacts and counting and recording the number of these against an optimal performance versus impact curve and reporting percent of optimal performance, useful optimal life, and value of remaining less than optimal life for the device being used; and collecting performance metrics and providing historical data in some form via a smartphone app.

Collecting information or counts of strokes with excess vibrations typically associated with off-center impacts outside the "sweet spot" of the instrument being used for hitting.

Counting and detecting acceleration changes pre and post impact

Signaling to the user instances where they are exceeding preset levels of incidents of off-center vibration.

Signaling to the user instances of exceeding preset levels or acceptable counts of pre and post impact deceleration of the instrument Additional method steps can include:

utilizing a training device disposed on or within a sporting goods article such as a tennis racket, by way of example and not of limitation, wherein the device is a vibration dampener that is hollow within a contains a device to sense impact and trigger a signal, after a programmable time delay, that is correlated with good hitting practice, the device alerting the player when she could have already looked up from the hitting zone to follow or track the tennis ball struck in the stroke with a series of potential feedbacks: sound, lights, vibration, electric stimulation, pressure, temperature change (general or broad list of human-possible sensations);

utilizing a second device mounted to the head via a head-band, by way of example and not of limitation, that could be wrapped around the head or a hat, for example that would accept a trigger notification from the first device and provide feedback to the player indicating if he has held his head in the proper position a sufficient amount of time;

utilizing additional devices to attach to the waist or legs or elsewhere that provide additional feedback to the player;

detecting impacts and instrument acceleration events, and storing, recording, and graphing these in formats suitable for visual analyses and coaching;

detecting the full path of a stroke, or other motion being monitored, and orientation of the device as it moves through the path, from impact through follow-through, and count time and/or distance and signal when the player has executed a full stroke. (The arch or path of the racket through a complete stroke is determined by use of various associated measures: height of the racket, or other device or equipment as applicable, from the ground, degrees of rotation, acceleration, compass, gyroscope, of the monitoring object 500 by detecting its orientation: where it is facing at the beginning and end of the stroke. If the face of the device faces towards the direction of the path of the ball at the beginning and now it faces away from the path of the ball after a period, then these measures correlate to the degree of completeness of the stroke through beginning and follow-through);

incorporating the impact detection on a wrist wearable device that the player wears. (The vibration detection triggers a timing mechanism that then triggers a feedback that correlates and teaches the proper delay for a player to have tracked the ball after impact. The wrist band also would associate the orientation of the inside of the hand as it follows through a full forehand stroke through a timing period correlated with a full stroke. The same wrist band on the side facing the direction of the ball and in the back side of the hand would also change orientation through a timing period correlated with a full backhand stroke);

incorporating a leg-band in order to detect impact with the foot, such as, for example, in soccer. (The impact detection device could also be integrated into a shoe for convenience); and training to keep the head down post kick.

utilizing incorporation with a smartphone for logging of information for a player and/or a coach.

It will be apparent to those skilled in the art, after reading this disclosure, which methods steps disclosed can be performed simultaneously or in a different order than that depicted or omitted given the nature of a particular procedure.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

What is claimed is:

1. A device for training peripheral vision discipline to record an impact and to provide a cue or feedback with a proper delay between action and instinctual eye tracking, improve head stability throughout the follow through, and help hand-eye coordination, and thereby to improve one's performance, the device comprising:

an impact sensor to detect a plurality of impacts of an object, wherein the impact sensor detects a time and a quality of each object impact to a sporting article for use to improve peripheral vision discipline;

a recorder to record all impacts an object used in a sport activity has experienced, wherein the device records the time and the quality of each impact for use to improve peripheral vision discipline and break instinctual eye tracking; and a transmitter to provide alerts of light flashes in light patterns with variable intermittent delays to teach a correct learning delay, to indicate less than optimal performance, and to provide notification in a feedback signal of light flashes in light patterns with variable intermittent delays to teach a correct learning delay with a light flashing feedback for peripheral vision discipline, triggered and transmitted with a programmable delay, for training a non-response and break the instinctual eye tracking reflex post impact;

wherein the device is configured for eye-gaze training through peripheral vision to train a proper delay and break the instinctual eye tracking; and wherein the device provides for detection, recordation, classification, translation, transmission, and learning, all associated with teaching and learning the proper way of striking an object with another object with proper peripheral vision discipline.

2. The device of claim 1, wherein the device is configured for placement and use upon a sporting equipment device.

3. The device of claim 1, wherein the device is configured for placement and use upon a person engaging a sporting equipment device.

4. The device of claim 1, wherein the sensor is configured to detect the impact of an object through one of movement, vibration, and/or noise.

5. The device of claim 1, wherein a feedback signal is triggered and transmitted with a programmable delay.

6. The device of claim 1, wherein a feedback signal is recorded and correlated with the detection of the impact and with different alerts and notifications.

7. The device of claim 1, wherein the device is configured to record, store, transmit, and display the results of the detection, feedback signals with success a subject keeping his/her head stable during the time of impact detection and after the time delay being trained to the subject through peripheral vision discipline.

8. The device of claim 1, wherein the feedback signal for teaching the proper learning delays is transmitted through the transmitter, and the transmitter comprises one of a) light flashes of varying intensity color and patterns, and b) cessation of an existing signal in various forms: sounds, light, vibration, temperature change, electrical shock, electrical signal to the brain through and electrode, light flashes, light patterns with varying intermittent delays, the signals for breaking the instinctual eye tracking through peripheral vision discipline training.

9. A method for training peripheral vision discipline to record an impact and to provide a cue or feedback with a proper delay between action and instinctual eye tracking, improve head stability throughout the follow through, and help hand-eye coordination, and thereby to improve one's performance, the method comprising:

utilizing a training device to detect the impact of an object, the training device comprising:

an impact sensor to detect a plurality of impacts of an object, wherein the impact sensor detects a time and a quality of each object impact to a sporting article for use to improve peripheral vision discipline;

a recorder to record all impacts an object used in a sport activity has experienced, wherein the device records the time and the quality of each impact for use to improve peripheral vision discipline and break instinctual eye tracking; and a transmitter to provide alerts of light flashes in light patterns with variable intermittent delays to teach a correct learning delay with a light flashing feedback for peripheral vision discipline, to indicate less than optimal performance, and to provide notification in a feedback signal of light flashes in light patterns with variable intermittent delays to teach a correct learning delay, triggered and transmitted with a programmable delay, for training a non-response and break the instinctual eye tracking reflex post impact;

wherein the device is configured for peripheral vision discipline to train a proper delay and desired response between the impact and subsequent follow-through for a user's eyes and head to not track the propelled object impacted;

utilizing one or more of movement, vibration, noise, and/or other means to detect the impact of the object;

providing an alert of light flashes in light patterns with variable intermittent delays to teach a correct learning delay and to indicate less than optimal performance;

transmitting and providing notification of light flashes in light patterns with variable intermittent delays to teach a correct learning delay for training a response;

utilizing a detector operatively associated with each sensor and signal type providing an electrical response in the presence of said signal;

affixing the training device to the trainee's body or the equipment or tool being impacted that can output some feedback signal;

triggering and transmitting with a programmable delay the signal or feedback output; and recording and correlating the feedback signal with the detection of the impact and with different feedback transmissions and signals;

wherein the method provides for detection, recording, classification, translation, transmission, and learning, all associated with teaching and learning the proper way of striking an object with another object with proper peripheral visual training to break instinctual eye tracking reflex post-impact.

10. The method according to claim 9, further comprising:
recording, storing, transmitting and displaying by the device the results of the detection, feedback and correlation with success a subject keeping his/her head stable during the time of impact detection and after the time delay being trained to the subject through peripheral vision discipline.

11. The method according to claim 9, further comprising:
transmitting through one or more of a) vibration, b) sound, c) light flashes of varying intensity color and patterns, and d) cessation of an existing signal in various forms: sounds, light, vibration, temperature change, electrical shock, electrical signal to the brain through and electrode, light flashes, light patterns with varying intermittent delays, the signals for teaching the proper learning delays and enhanced peripheral vision discipline.

12. The method according to claim 9, further comprising:
detecting impacts and counting and recording the number of these against an optimal performance versus impact curve and reporting percent of optimal performance, useful optimal life, and value of remaining less than optimal life for the device being used.

13. The method according to claim 9, further comprising:
collecting performance metrics and providing historical data in some form via a smartphone app; and
incorporating the metrics and data with a smartphone for logging of information for a player and/or a coach.

14. The method according to claim 9, further comprising:
utilizing a training device disposed on or within a sporting goods article, wherein the device is a vibration dampener that is hollow within and contains a device to sense impact and trigger a signal, after a programmable time delay, that is correlated with good hitting practice, the device alerting a subject when the subject could have already looked up from the hitting zone to follow or track the tennis ball struck in the stroke with a series of feedbacks.

15. The method according to claim 9, further comprising:
utilizing a second training device mounted to the head of a subject via a head-band to accept a trigger notification from the first training device; and
providing feedback to the subject indicating whether the head of the subject is in the proper position enough time.

16. The method according to claim 9, further comprising:
detecting the path of a stroke, or other motion being monitored, and orientation of the device as it moves through the path, from impact through follow-through, and counting time and/or distance and signal when a subject has executed a full stroke.

17. The method according to claim 9, further comprising:
incorporating impact detection on a wrist wearable device worn by a subject, wherein the vibration detection triggers a timing mechanism that then triggers a feedback that correlates and teaches the proper delay for a player to have tracked the ball after impact, and wherein the wrist band associates the orientation of the inside of the hand as it follows through a full forehand stroke through a timing period correlated with a full stroke.

18. The method according to claim 9, further comprising:
utilizing an additional training device to attach to the body of a subject to provide additional feedback to the subject.

\* \* \* \* \*